United States Patent [19]

Creasy et al.

[11] 4,003,963
[45] Jan. 18, 1977

[54] VINYL CHLORIDE POLYMER BARRIER PACKAGING COMPOSITIONS

[75] Inventors: Walter Stanley Creasy, Bridgewater; Austin Emidio Barnabeo, Somerville, both of N.J.

[73] Assignee: Union Carbide Corporation, New York, N.Y.

[22] Filed: Dec. 8, 1975

[21] Appl. No.: 638,303

[52] U.S. Cl. .......................... 260/897 C; 264/289; 260/897 B
[51] Int. Cl.² .......................................... C08L 23/08
[58] Field of Search ............................... 260/897 C

[56] References Cited

UNITED STATES PATENTS

| | | | |
|---|---|---|---|
| 3,111,370 | 11/1963 | Okamura et al. | 18/54 |
| 3,419,654 | 12/1968 | Chiba et al. | 264/210 |
| 3,585,177 | 6/1971 | Gardner et al. | 260/87.3 |
| 3,859,390 | 9/1975 | Tsuji et al. | 260/899 |
| R26,928 | 6/1970 | Miller et al. | 264/230 |

FOREIGN PATENTS OR APPLICATIONS

| | | |
|---|---|---|
| 703,945 | 2/1965 | Canada |
| 767,553 | 9/1967 | Canada |

OTHER PUBLICATIONS

Y. S. Shur et al., J. App. Poly. Sci. 19 1337–1346 (1975).

*Primary Examiner*—l
*Assistant Examiner*—Carman J. Seccuro
*Attorney, Agent, or Firm*—Bernard F. Crowe

[57] ABSTRACT

Blends of vinyl chloride polymers containing no carboxyl groups and about 10 to about 30 percent by weight of an ethylene/vinyl alcohol copolymer containing greater than 50 mole percent of vinyl alcohol therein provided excellent barrier packaging materials.

12 Claims, No Drawings

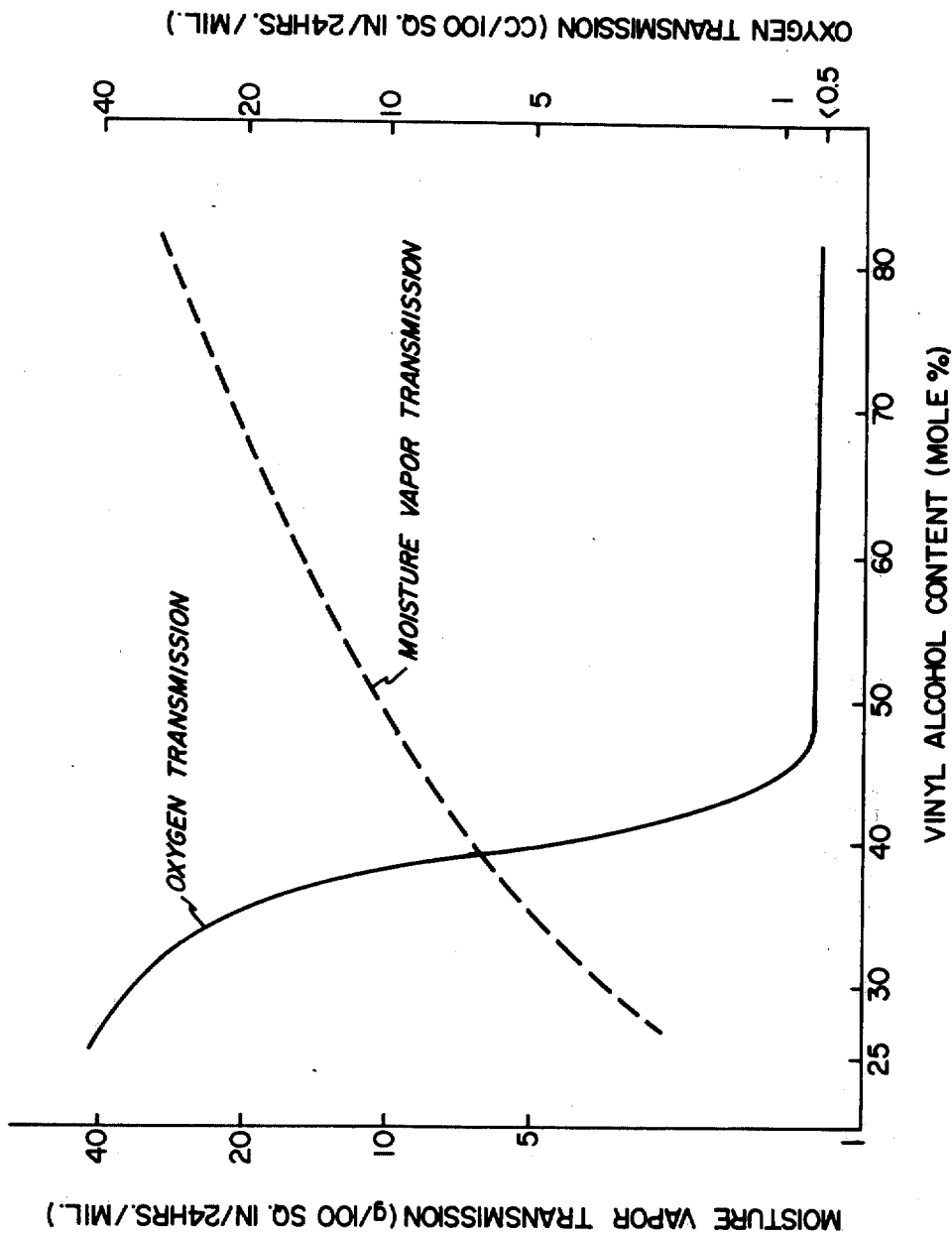

VINYL CHLORIDE POLYMER BARRIER PACKAGING COMPOSITIONS

BACKGROUND OF THE INVENTION

This invention pertains to vinyl chloride polymerethylene/vinyl alcohol copolymer barrier packaging compositions and in particular to those compositions having enhanced resistance to gas permeability and moisture vapor transmission.

Polyvinyl alcohol and its copolymers containing large amounts of hydroxyl groups are known to possess very low gas permeabilities. However, the use of such materials in packaging applications is severely restricted by moisture sensitivity imparted by the hydroxyl function. The gas permeabilities of polyvinyl alcohol homopolymer increase exponentially as a function of relative humidity. Copolymers of vinyl alcohol although somewhat less sensitive are still prone to this defect for packaging materials. Commercial standards for acceptable packaging materials require that the films used have a low gas permeability particularly to oxygen and in addition have a low moisture vapor transmission rate. One solution to this problem has been proposed in U.S. Pat. No. 3,585,177, issued to D. M. Gardner et al. on June 15, 1971, in which a lower alpha olefin/vinyl alcohol copolymer is prepared having a residual ester content below 3.0% and an olefin content between 5.0 to 40% by weight and wherein the differential thermal analysis curve for the copolymer is a single narrow endotherm having a melting range of less than 30° C.

A more economical solution to the problem of providing suitable packaging materials having good barrier properties resides in blending cheaper resins with a balance of properties. This approach however is limited because of the problem of incompatability which exists between many available resins.

STATEMENT OF THE INVENTION

It has now been found that a composition suitable for barrier packaging materials having enhanced resistance to gas permeability and moisture vapor transmission is provided by a mixture of a vinyl chloride polymer having no carboxyl groups and about 10 to about 30% by weight based on the weight of vinyl chloride polymer of an ethylene/vinyl alcohol copolymer containing greater than about 61 weight percent or 50 mole percent of vinyl alcohol in said copolymer.

Ethylene/vinyl alcohol copolymers suitable for use in this invention are commercially available. These can be used as purchased or ethylene/vinyl acetate copolymers also commercially available can be converted by hydrolysis to suitable ethylene/vinyl alcohol copolymers. The ethylene/vinyl alcohol copolymers described herein are essentially fully hydrolyzed ethylene/vinyl acetate copolymers although copolymers containing up to about 3% by weight of residual vinyl acetate may also be used. It is worthy of note that ethylene/vinyl alcohol copolymers containing greater than 50 mole percent vinyl alcohol copolymerized therein can be converted into films which have outstanding resistance to oxygen but are unsatisfactory because of their poor sensitivity to moisture. This deficiency is remedied by blending these ethylene/vinyl alcohol copolymers with vinyl chloride polymers including both homopolymers and copolymers of vinyl chloride with copolymerizable ethylenically unsaturated monomers which contain no carboxyl groups.

The vinyl chloride polymer must not contain carboxyl groups as would be present where vinyl chloride is copolymerized with acrylic acid, methacrylic acid, maleic acid, and the like since the carboxyl functionality which results in crosslinking with pendant OH groups in the ethylene/vinyl alcohol copolymers results in gelation and loss of compatability of the two resins.

A particularly preferred vinyl chloride polymer is one containing at least 98.1 percent by weight of vinyl chloride and about 0.3 to 1.9 percent by weight of ethylene. The preparation of this copolymer is described in U.S. Pat. No. 3,843,616 which is incorporated herein by reference. Other exemplary monomers which can be copolymerized with vinyl chloride to provide one of the components of this invention include vinyl esters, such as, vinyl acetate, vinyl propionate, vinyl laurate, vinyl stearate, and the like; other lower alpha-olefins, such as, propylene, butylene, and the like; acrylonitrile; and alkyl acrylates or methacrylates having up to 18 carbon atoms in the alkyl moiety such as methyl acrylate, butyl acrylate, lauryl acrylate, stearyl acrylate, methyl methacrylate, ethyl methacrylate, decyl methacrylate, hexadecyl methacrylate, and the like. The vinyl chloride/vinyl ester copolymers can contain about 5 to about 20 weight percent of vinyl acetate copolymerized therein with a range of about 8 to about 15 percent by weight of vinyl acetate being particularly preferred. The preferred inherent viscosity of these vinyl chloride/vinyl acetate copolymers, which are known in the art, lies in the range of about 0.50 to about 0.54, although inherent viscosities of about 0.47 to about 1.0 can also be used if desired. Vinyl chloride homopolymers, also known in the art, can be used in the practice of this invention preferably at inherent viscosities in the range of about 0.5 to about 1.0 although those having values of 0.40 to about 1.4 can also be used if desired (ASTM 1243, Method A).

A preferred commercial grade of vinyl chloride polymer is one known in the art as molding resins. These contain additives, as for example, impact modifiers, such as, methyl methacrylate-butadiene-styrene terpolymers; extrusion aids, such as, methyl methacrylate polymers; heat stabilizers, such as, dioctyl tin mercaptide and maleates; antioxidants, such as, epoxidized soybean oil; lubricants, such as, hydrocarbon waxes; ultraviolet stabilizers, colorants, and the like. Even when these additives are present at levels as high as 20 to about 25% by weight of the vinyl chloride polymer, surprisingly they do not interfere with the resistance of the combination of vinyl chloride polymers and ethylene/vinyl alcohol polymers to oxygen permeability and moisture vapor transmission.

It was unexpected that a combination of a vinyl chloride polymer and an ethylene/vinyl alcohol copolymer would be compatible particularly after films fabricated from these compositions had been biaxially oriented.

Another desirable feature of these films is that they are transparent which is particularly desirable in a food packaging film. When the vinyl chloride polymers in the compositions described above were replaced by several readily available and commercially used thermoplastic resins, including, polyethylene, poly(acrylonitrile-butadiene-styrene), polystyrene, and styrene-acrylonitrile copolymer, films made from these blends exhibited gross incompatability, opacity, and a pronounced tendency to delaminate making them unacceptable for use as barrier packaging materials.

As will be seen in the working examples following, the amounts of vinyl chloride polymers and ethylene/vinyl alcohol copolymers in these compositions is critical in order to obtain a balance of low oxygen permeability coupled with low moisture vapor transmission. The fortuitous combination of these two polymers affords an opportunity to take advantage of one property of each without seriously detracting from the desired physical properties of each. In addition the blends of vinyl chloride polymers and ethylene/vinyl copolymers provide films with desirable mechanical properties.

vinyl chloride polymer/ethylene-vinyl alcohol copolymer and 70/30 vinyl chloride polymer/ethylene-vinyl alcohol copolymers.

As can be seen from the data in Table 1 below the poor oxygen permeability of vinyl chloride resin is greatly altered by combining this resin with the ethylene-vinyl alcohol copolymer without loss of the desirable low oxygen permeability values of the latter copolymer. In addition the resistance to moisture vapor transmission of the ethylene-vinyl alcohol copolymer is enhanced.

TABLE 1

EFFECT OF ORIENTATION AND EVOH CONTENT ON FILM PERMEABILITY AND MOISTURE VAPOR TRANSMISSION

| POLYMER BLEND PVC[a]/EVOH[b] | OXYGEN PERMEABILITY[c] NON-ORIENTED BIAXIALLY ORIENTED | | MOISTURE VAPOR TRANSMISSION[d] NON-ORIENTED |
|---|---|---|---|
| 100/0 | 15.0 | ca. 15 | 3 |
| 90/10 | 8.2 | 4.5 | — |
| 80/20 | 2.8 | 0.5 | 2.3 |
| 70/30 | 1.1 | 0.5 | 1.7 |
| 0/100 | 0.5 | 0.5 | 5 |

[a]Vinyl chloride molding resin described in Example 1.
[b]Ethylene/vinyl alcohol polymer described in Example 1.
[c]cc/mil/100 in.$^2$/24 hrs. atm.
[d]g./mil/100 in.$^2$/24 hrs. at 100° F. (38° C.) and 90% relative humidity (R.H.)

The criticality of the vinyl alcohol content of the ethylene/vinyl alcohol copolymers is demonstrated in the Figure which delineates the permeability of films from hydrolyzed ethylene/vinyl acetate copolymers to both moisture vapor transmission and oxygen transmission. This graph shows that while the oxygen transmission of hydrolyzed ethylene/vinyl acetate is markedly decreased in the range from about 50 mole percent vinyl alcohol content upwards, the moisture vapor transmission is markedly increased thus negating the advantages derived from ethylene/vinyl alcohol copolymer used alone for a barrier packaging material.

The invention is further described in the Examples which follow. All parts and percentages are by weight unless otherwise specified.

EXAMPLE 1

A compounding extruder was used to blend twenty parts by weight of an ethylene/vinyl alcohol copolymer containing 26 percent of ethylene and 74 percent of vinyl alcohol having a reduced viscosity of 0.88 (in dimethyl formamide at 25° C. as 0.2% solution) and a Tg of 65° C. with 80 parts by weight of Bakelite QMDA-4488 (a vinyl chloride molding resin consisting of about 79 percent of a vinyl chloride resin containing 1.2 percent ethylene copolymerized therein, 13.5 percent of a methyl methacrylate-butadiene-styrene terpolymer impact modifier, 2.5 percent of a polymethylacrylate extrusion aid and the remainder conventional heat and light stabilizers, colorants, antioxidants, lubricants and the like, commonly used in the vinyl chloride polymer field). The two resins were then converted into films in a heated press. Some of these films obtained thereby were biaxially oriented (3:1 stretch ratio). The oxygen permeability of non-oriented and biaxially oriented films were recorded in Table 1 as well as the moisture vapor transmission of non-oriented film. For comparison films made from 100 percent vinyl chloride resin and 100 percent ethylene/vinyl alcohol copolymer were also prepared and examined together with combinations of 90/100 by weight of Table 2 contains a comparison of non-oriented and biaxially oriented films prepared from an 80/20 mixture of vinyl chloride polymer/ethylene-vinyl alcohol copolymer (PVC/EVOH) in mechanical properties.

TABLE 2

EFFECT OF ORIENTATION ON MECHANICAL PROPERTIES OF PVC/EVOH BLENDS (80/20 wt. %)

| PROPERTY | NON-ORIENTED | ORIENTED |
|---|---|---|
| Tensile Modulus[1], psi | 300,000 | 280,000 |
| Tensile Strength[1], psi | 5,900 | 4,800 |
| Elongation at break[1],% | 3 | 86 |
| Pendulum Impact[2] ft. lbs./in$^3$ | 5 | 25 |
| Glass Transition Temperature[3], ° C. | 70 | 70 |

[1]ASTM D-638-60
[2]ASTM D-256-56
[3]Determined by the method described in "Mechanical Properties of Polymers", L. E. Nielson, Reinhold Publishers, NYC, (1962).

EXAMPLE 2

Eighty parts of a vinyl chloride/ethylene molding resin containing about 1.2 percent by ethylene copolymerized therein having an inherent viscosity of about 0.96 (ASTM D-1243, Method A) was blended in a 2-roll mill with 20 parts of the ethylene/vinyl alcohol copolymer described in Example 1. The vinyl chloride resin contained a small amount (0.5% based on the vinyl chloride resin) of a petroleum wax lubricant.

Bioriented films of the blend were obtained having an oxygen permeability of 0.41 and 0.54 cc./mil/100 in. $^2$/24 hrs. atm. Samples of non-oriented film of this blend showed an oxygen permeability of 4.2 cc./mil/100 in. $^2$/24 hrs. atm.

EXAMPLE 3

A vinyl chloride homopolymer (80 parts) having an inherent viscosity (ASTM D-1243 Method A) of 0.78 was blended on a two-roll mill with 20 parts of the ethylene/vinyl alcohol copolymer described in Example 1. The vinyl chloride homopolymer contained about 1% of dioctyl tin mercaptide and 0.5% of dioctyl tin maleate as heat stabilizers based on the weight of vinyl chloride homopolymer.

A plaque was made of the compatible blend as well as biaxially oriented films. The mechanical properties of these are shown in Table 3.

TABLE 3

| PROPERTY | MOLDED PLAQUE | BIAXIALLY ORIENTED FILM |
|---|---|---|
| Tensile Modulus[1], psi | 313,000 | 400,000 |
| Tensile Strength[1], psi | 4,370 | 17,800 |
| Elongation at break[1], psi | 1.6 | 57 |
| Pendulum impact[2], ft. lbs./in.[3] | 5 | 590 |

[1] ASTM D-638-60
[2] ASTM D-256-56

EXAMPLE 4

When Example 1 is repeated with the exception that normally solid vinyl chloride homopolymer is substituted for the vinyl chloride/ethylene copolymer, biaxially oriented films having comparable oxygen permeability and moisture vapor transmission are obtained.

EXAMPLE 5

When Example 1 is repeated with the exception that normally solid vinyl chloride/vinyl acetate copolymer is substituted for the vinyl chloride/ethylene copolymer, biaxially oriented films having comparable oxygen permeability and moisture vapor transmission are obtained.

EXAMPLE 6

Forty parts of a normally solid vinyl chloride/acrylonitrile copolymer containing 20 percent by weight of acrylonitrile copolymerized therein having an inherent viscosity of 0.6 (ASTM 1243, Method A) was stabilized with 5 percent of dioctyl tin maleate based on the weight of copolymer and mixed in a Brabender mixer at 200° C. for 10 minutes with the ethylene/vinyl alcohol copolymer described in Example 1. The resultant blend was compatible and had a melt index at 180° C. (10 P and 10 minutes — ASTM D-1238-625) of 3.38 dg./min. A bioriented film of this blend showed an oxygen permeability of 0.51 cc./mil/100 in.$^2$/24 hrs. atm. Mechanical properties of a plaque of the blend include a Tg of 75° C., a tensile modulus of 379,000 psi, a tensile strength of 7390 psi, a elongation at break of 2.2% and a pendulum impact strength of 3 ft. lbs./in.$^3$.

The oxygen permeability of a bioriented film of the vinyl chloride/acrylonitrile copolymer alone was 3.3 cc./mil/100 in.$^2$/24 hrs.

CONTROLS A, B AND C

Attempts to obtain a compatible blend of the ethylene/vinyl alcohol copolymer described in Example 1 with low density polyethylene, high density polyethylene and styrene-acrylonitrile copolymer at weight ratios of 1:1 to 1:3 with a mixing extruder at 190° C. were unsuccessful. Films obtained from such blends were physically unacceptable and delaminated.

Although the invention has been described in its preferred forms with a certain degree of particularity, it is understood that the present disclosure of the preferred forms has been made only by way of example and that numerous changes made be resorted to without departing from the spirit and the scope of the invention. What is claimed is:

1. Composition suitable for the fabrication of barrier packaging materials having enhanced resistance to oxygen permeability as well as moisture vapor transmission consisting essentially of a mixture of:
   A. A vinyl chloride polymer having no carboxyl groups, and
   B. About 10 to about 30 percent by weight, based on the weight of vinyl chloride polymer, of an ethylene/vinyl alcohol copolymer containing greater than about 61 weight percent or 50 mole percent of vinyl alcohol in said copolymer.

2. Composition claimed in claim 1 wherein the vinyl chloride polymer is a homopolymer.

3. Composition claimed in claim 1 wherein the vinyl chloride polymer is a copolymer of a lower alpha-olefin and vinyl chloride.

4. Composition claimed in claim 3 wherein the alpha-olefin is ethylene.

5. Composition claimed in claim 3 wherein the alpha-olefin is propylene.

6. Composition claimed in claim 1 wherein the ethylene/vinyl alcohol copolymer contains at least about 74 weight percent of vinyl alcohol copolymerized therein.

7. Composition claimed in claim 1 wherein the vinyl chloride polymer is a copolymer of acrylonitrile and vinyl chloride.

8. Film of the composition claimed in claim 6 having a maximum oxygen permeability of about 1.1 cc./mil/100 in.$^2$/24 hrs. atm. and a maximum moisture vapor transmission of about 1.7 g.100 in.$^2$/24 hrs. mil at 38° C. and 90% relative humidity.

9. Biaxially oriented film of the composition claimed in claim 6 having an oxygen permeability of less than 0.5 cc./mil/100 in.$^2$/24 hrs. atm.

10. Biaxially oriented film of the composition claimed in claim 7 having a oxygen permeability of about 0.5 cc./mil/100 in.$^2$/24 hrs. atm.

11. Packaging films and sheets fabricated from the composition of claim 1.

12. Packaging films and sheets claimed in claim 11 in biaxially oriented form.

* * * * *